March 9, 1954 A. G. BADE 2,671,360
VARIABLE-SPEED TRANSMISSION
Filed Aug. 19, 1949 2 Sheets-Sheet 2
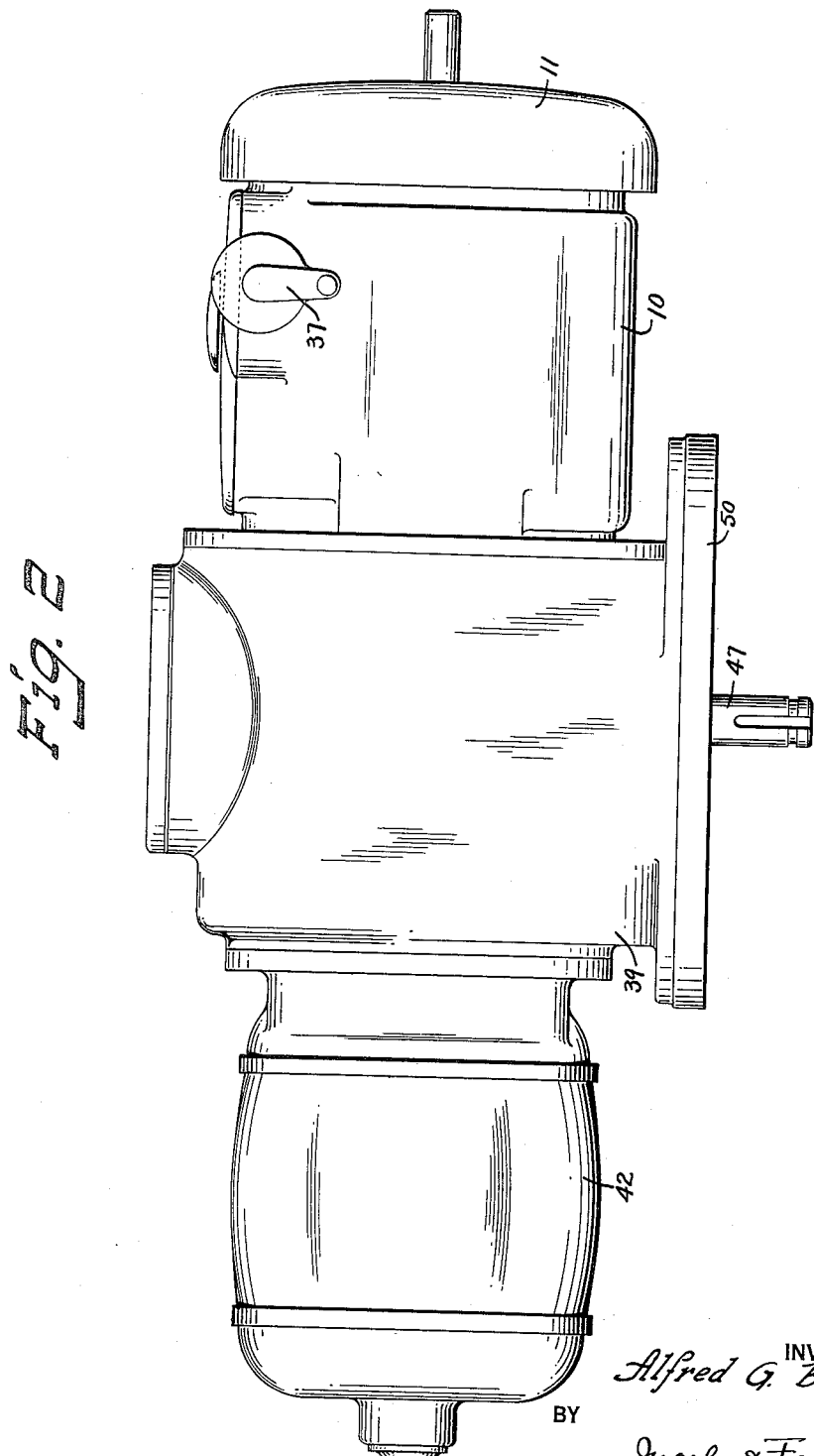
INVENTOR
Alfred G. Bade
BY
Quarles & French
ATTORNEYS Patented Mar. 9, 1954

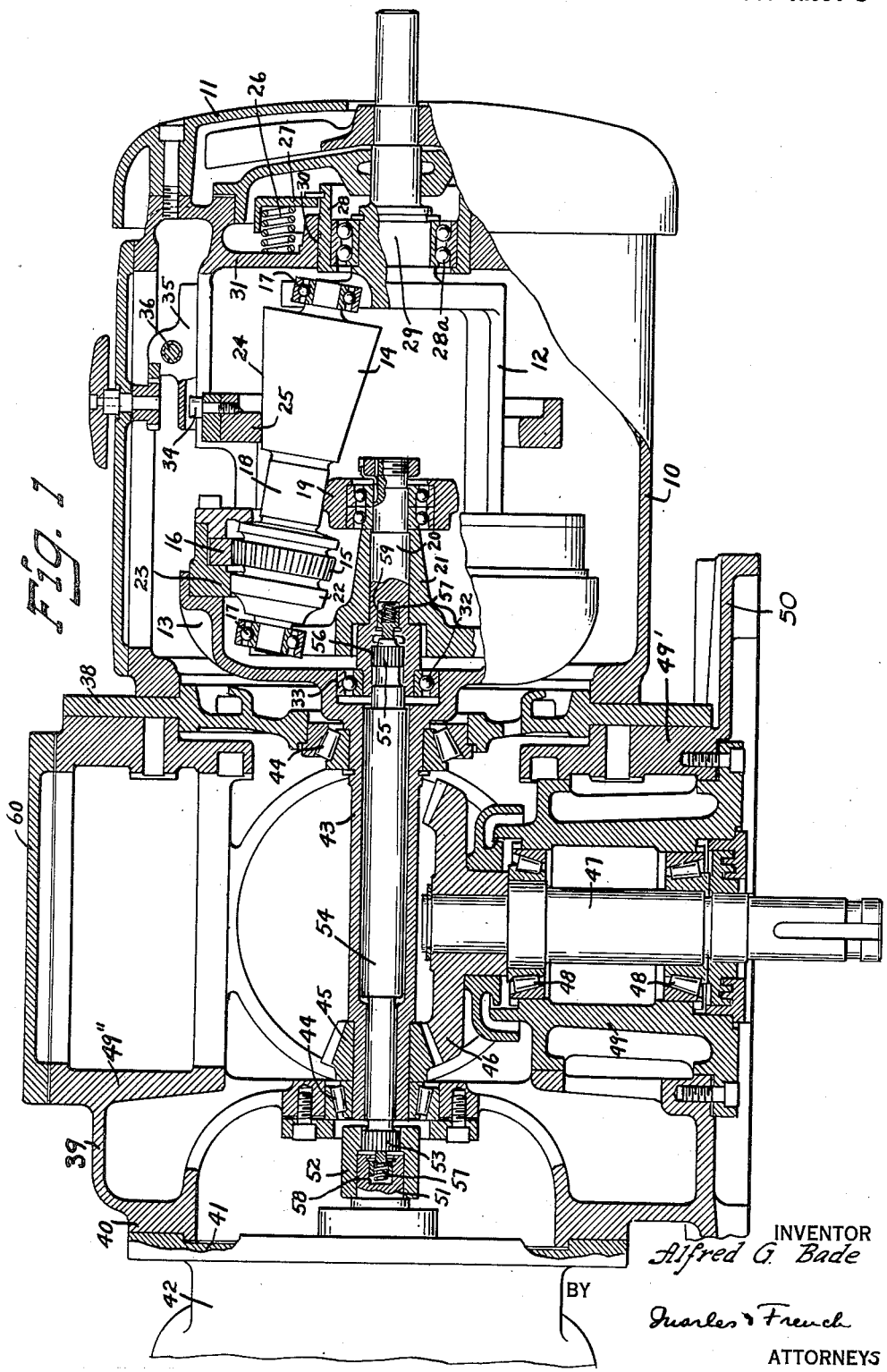

2,671,360

UNITED STATES PATENT OFFICE 2,671,360

VARIABLE-SPEED TRANSMISSION

Alfred G. Bade, Wauwatosa, Wis., assignor to The Falk Corporation, Milwaukee, Wis., a corporation of Wisconsin Application August 19, 1949, Serial No. 111,175

2 Claims. (Cl. 74—740)

1

The invention relates to variable speed transmissions.

The main object of the invention is to provide a variable speed transmission of the planet roller type in which the drive shaft for the transmission is on the same end of the housing thereof as the shaft to be driven.

A further object of the invention is to provide a variable speed transmission of the planet roller type in which the drive shaft for the rotary cage of the transmission extends through and is concentric with the ring gear carrier of the transmission, which carrier is also preferably geared by speed reducing gearing to the shaft to be driven also journalled in the supporting housing of the transmission.

A further object of the invention is to provide a variable speed transmission of the planet roller type in which the driven shaft is connected with a right angle torque multiplier output shaft preferably disposed between the motor and the transmission.

The invention further consists in the several features hereinafter described and more particularly defined by claims at the conclusion hereof.

In the drawings:

Fig. 1 is a vertical sectional view through variable drive transmission embodying the invention;

Fig. 2 is an elevation view of the transmission.

Referring to the drawings, the particular form of planet roller type of variable speed mechanism which I have shown herein is more particularly shown and described in the application for U. S. patent of Alfred G. Bade, for "Variable Speed Transmission," Serial No. 596,353, filed May 28, 1945, to which reference may be had. Briefly, this mechanism includes a housing 10 having a head 11 bolted thereto, a rotary cage 12, a ring gear carrier 13, a plurality of planet rollers 14, only one being shown but preferably three in number, mounted to rotate with and relative to the cage and each having a pinion 15 meshing with a ring gear 16 mounted on the carrier 13. Each roller 14 is journalled in bearings 17 mounted for radial sliding movement relative to the cage 12 and is held in operative position by fulcruming engagement of its intermediate cylindrical portion 18 with a roller or ring 19 rotatably mounted on a stub or input shaft 20 secured in a hub 21 of the cage and bearing rolling engagement at one end through a tapered section 22 with a ring 23 on the carrier and bearing rolling engagement at its other end through an axially extended tapered section 24 with a ring 25, the angle of the taper of each section 22 and 24 being equal to the angle of inclination of the roller axis and in such direction that the outer extremities of each are parallel to the axis of rotation of the cage 12. The above bearing engagements are maintained by resiliently urging the cage 12 toward the right as viewed in Fig. 1 by springs 26 acting on a ring 27 operatively connected to a bearing housing 28 carrying a bearing 28a for the front end shaft extension 29 of the cage 12, said housing 28 being slidably mounted in a hub 30 of an end 31 of the housing 10, the stub shaft 20 carrying bearings 32 slidably mounted in a bore 33 in the carrier 13. As in the aforesaid application, the speed changes are effected by means for shifting the ring 25 lengthwise along the tapered section 24 by engagement of a pin 34 on said ring with a slotted slidable block 35 which, as more particularly shown in said application, is moved to move the ring 25 by the turning of a screw shaft 36 provided with a crank handle 37.

The housing 10 is mounted on a detachable end plate 38 of a transmission housing 39 whose other end 40 is adapted to receive the base 41 of an electric motor 42. As herein shown, the ring gear carrier 13 has a hollow output shaft extension 43 which is journalled in tapered roller bearings 44 mounted in the ends 38 and 40 of the housing, said shaft carrying a bevel gear 45 meshing with a larger bevel gear 46 at right angles thereto and mounted on an output shaft 47 that is shown extending downward through and beyond the bottom of the housing. The housing 39 is equipped with a suitable mounting base 50 preferably widely extended, as indicated, to provide a stable foundation for the housing and parts carried thereby including the motor 42 and variable speed transmission housing 10.

In this instance the shaft 47 is shown journalled in axially spaced bearings 48 mounted in a suitable bearing block 49 detachably fixed in a hollow boss 49' provided in the bottom of the housing. The housing shown is equipped with a second hollow boss 49" in the top thereof having an internal configuration substantially identical with that of the boss 49' and capable of receiving and supporting the bearing block 49 when transferred from the position shown. The bearing block 49 carrying the shaft 47 may thus be interchangeably seated in either of the bosses 49' or 49" so that the shaft 47 carried thereby may project in either of two directions, either downward, as shown, or upward from the housing. Moreover, the two bosses are symmetrically disposed with respect to the axis of shaft 43, so that in either position of the output shaft 47 the gear 46 thereon may mesh with the gear 45 so as to be driven thereby.

The shaft 51 of the motor 42 carries a tubular cap 52 whose splined outer end is engaged by the splined end 53 of an extension shaft 54 which extends loosely through bores of the shaft 43 and has a splined end 55 engaging the splined bore 56 of the stub shaft 20. The shaft 54 is maintained in its proper lengthwise position by a spring 57 bearing on each end of said shaft, one of said springs being disposed in a spring seat in a bore 58 in the motor shaft 51 and the other in a bore 59 in the stub shaft 20.

With the above construction, the motor driving through the shaft 54 rotates the cage 20 which through the rotation of the rollers 14 rotates the carrier 13 which through its gear 45 rotates the gear 46 and the driven shaft 47 at a reduced speed, thus multiplying the torque from that obtained by the drive through the roller planet mechanism, the change in speed of the shaft 47 being effected by the shifting of the ring 25 relative to the rollers 14.

In some instances the motor 42 may be mounted on the top of the housing in place of the top cover plate 60 and operatively connected to the cage 20 by a drive connection including a shaft extending through a hollow shaft extension of the gear carrier 13, and other modifications from the specific arrangement shown may be made, so that the invention herein is not to be limited to any specific arrangement of parts except in so far as such limitations are included in the appended claims.

What I claim as my invention is:

1. In a power transmission the combination of a housing, means on one side thereof for receiving and supporting a variable speed mechanism, means on another side of said housing for receiving and supporting a driving electric motor, means journalled in said housing and adapted to be driven by said motor for driving said mechanism, a power output shaft journalled in said housing, gearing in said housing through which said shaft is driven, means adapted to be driven at variable speeds from said mechanism for driving said gearing, and an extended mounting base for said housing providing a stable foundation therefor and through which said motor and mechanism are supported, said power output shaft being extended through said mounting base.

2. In a power transmission the combination of a housing, means on one side of said housing for receiving and supporting a variable speed mechanism, means on another side of said housing for receiving and supporting a driving electric motor, means journalled in said housing and adapted to be driven by said motor for driving said mechanism, a power output shaft, means for mounting said shaft in said housing, said means including elements by which the position of said shaft may be modified to project said shaft in any of a plurality of directions, gearing in said housing through which said shaft is driven at variable speeds from said mechanism in any selected position of said shaft, and a mounting base for said housing providing a stable foundation therefor and through which said motor and mechanism are supported.

ALFRED G. BADE.

References Cited in the file of this patent

UNITED STATES PATENTS

| Number | Name | Date |
|---|---|---|
| 1,489,802 | Turner | Apr. 8, 1924 |
| 1,835,506 | Linn | Dec. 8, 1931 |
| 2,037,890 | Dow | Apr. 21, 1936 |
| 2,038,326 | Wagner | Apr. 21, 1936 |
| 2,073,348 | Merkle | Mar. 9, 1937 |
| 2,090,221 | Morgan | Aug. 17, 1937 |
| 2,109,695 | Graham | Mar. 1, 1938 |
| 2,136,692 | Johnson | Nov. 15, 1938 |
| 2,138,618 | Seyerle | Nov. 29, 1938 |
| 2,148,564 | Kuhns | Feb. 28, 1939 |
| 2,293,200 | Foote | Aug. 18, 1942 |
| 2,357,222 | Parsons | Aug. 29, 1944 |
| 2,457,431 | Bade | Dec. 28, 1948 |

FOREIGN PATENTS

| Number | Country | Date |
|---|---|---|
| 179,838 | Switzerland | Sept. 30, 1935 |
| 335,667 | Great Britain | Oct. 2, 1930 |
| 400,228 | Great Britain | Oct. 20, 1933 |
| 461,017 | Germany | June 12, 1928 |